(12) United States Patent
Pearson et al.

(10) Patent No.: US 8,022,657 B2
(45) Date of Patent: Sep. 20, 2011

(54) WASHING MACHINE WIRING TO REDUCE MECHANICAL TIMER CONTACT WELDING

(75) Inventors: James E. Pearson, Downers Grove, IL (US); Richard Louis Elkin, Schaumburg, IL (US)

(73) Assignee: Robertshaw Controls Company, Carol Stream, IL (US)

( * ) Notice: Subject to any disclaimer, the term of this patent is extended or adjusted under 35 U.S.C. 154(b) by 466 days.

(21) Appl. No.: 12/348,647

(22) Filed: Jan. 5, 2009

(65) Prior Publication Data
US 2010/0171449 A1  Jul. 8, 2010

(51) Int. Cl.
*H02P 1/42* (2006.01)
(52) U.S. Cl. ............ 318/785; 318/786; 318/751; 361/8; 361/13; 361/2; 361/159; 361/139; 327/365; 363/106
(58) Field of Classification Search .................. 327/365; 318/785, 786, 751; 361/8, 13, 2, 159, 139; 363/106
See application file for complete search history.

(56) References Cited

U.S. PATENT DOCUMENTS

| | | | | | |
|---|---|---|---|---|---|
| 3,696,903 | A | * | 10/1972 | Nethersell | 192/136 |
| 3,782,669 | A | * | 1/1974 | Lewis | 200/335 |
| 4,823,067 | A | * | 4/1989 | Weber | 318/799 |
| 5,013,990 | A | * | 5/1991 | Weber | 318/814 |
| 5,077,512 | A | * | 12/1991 | Weber | 318/776 |
| 5,130,624 | A | * | 7/1992 | Bashark | 318/280 |
| 5,159,255 | A | * | 10/1992 | Weber | 318/775 |
| 5,166,592 | A | * | 11/1992 | Bashark | 318/799 |
| 5,564,831 | A | * | 10/1996 | Bashark | 374/141 |
| 6,815,926 | B2 | * | 11/2004 | Fei et al. | 318/773 |
| 7,196,490 | B2 | * | 3/2007 | Kim et al. | 318/751 |

* cited by examiner

*Primary Examiner* — Rita Leykin
(74) *Attorney, Agent, or Firm* — Reinhart Boerner Van Deuren P.C.

(57) ABSTRACT

A control circuit for a washing machine that avoids contact bounce short circuit failures is provided. A washing machine that utilizes an induction motor including a starting winding used to start rotation of the motor at the beginning of a cycle. Such washing machines require that the motor be operated in both directions during different cycles. To enable such operation, a mechanical timer uses a pair of single pole, double throw switches in a switching assembly to reverse the L1 and neutral connections to the starter winding. To avoid the contact shorting problem, the control wiring runs either the L1 or neutral side of the voltage source, or both, through the centrifugal switch to open the input contact(s) once the motor has reached its operating speed. Then, if the switching assembly has L1 and N contacts touching at the same time, it will not result in a dead short.

15 Claims, 1 Drawing Sheet

WASHING MACHINE WIRING TO REDUCE MECHANICAL TIMER CONTACT WELDING

FIELD OF THE INVENTION

The present invention relates generally to washing machine control circuitry, and more particularly to control wiring for washing machine control circuitry to minimize potential short circuit fault modes.

BACKGROUND OF THE INVENTION

Each year literally millions of consumer appliances, such as washing machines, are manufactured and sold in the United States. To keep pace with consumers' increasing desire for new features and in order to properly care for the various types of fabrics and garments being sold today, the complexity of the control circuitry for such appliances continues to increase. At the same time, however, the increasing governmental requirements for energy efficiency and the consumer and competitive pressures to keep costs down have added increased stress on the design and manufacture of these appliances. Indeed, with consumer preferences often driven by costs and quality, as opposed to traditional brand loyalty, manufactures must ensure that their appliances are competitively priced and operate properly when purchased and installed by a consumer. As is recognized by such manufactures, any defect or failure to operate of a consumer appliance once purchased and installed will likely result in negative word of mouth severely impacting sales.

As such, manufactures have realized that one-hundred percent quality control has become an absolute necessity, particularly when so many appliances are manufactured each year. That is, settling for a quality control threshold of ninety-nine percent, and assuming for the sake of this example that one million units are produced, this ninety-nine percent quality control will result in 10,000 defective consumer appliances being sold and installed by consumers, who will then share their negative experiences with their friends and family. This is simply unacceptable.

To prevent such occurrences from happening, many consumer appliance manufactures now require one-hundred percent testing of all manufactured appliances before they are released from the factory for sale to consumers. Washing machines, for example, are connected to water and electrical supplies, and washing cycles are completed during the final assembly process of the appliance. In this way, any defects in the manufacturing process, will be identified and rectified before that particular unit is released for sale.

Unfortunately, to ease the ability of correcting any problems in the manufacturing process, each appliance is run before the final assembly is complete. For example, such quality testing may be begun and continue prior to final securing of the control panel of the appliance to the mounting panel of the washer.

It has been observed that occasionally during this quality testing and final assembly operation that faults have occurred in the control wiring of the appliance. Such faults, for example contact welding, may be attributed directly to excessive shock and vibration that may occur due to the excessive shock and vibration to which the entire appliance is subjected while moving down the conveyor system in the assembly plant while being tested. Such failure significantly increase the overall cost of manufacturing, and may result in failed units being released for customer sale if the high shock failure occurs at the end of the testing cycle.

For washing machines, such as top loading washing machines, one common failure that can be directly attributed to the high vibration or shock seen during the final stages of the manufacturing process as the washing machine is being quality tested is a contact welding problem resulting from a dead short between the L1 and neutral (N) sides of the 120 volt AC lines that power the washing machine. Specifically, many top loading washing machines utilize a mechanical timer to switch the L1 and N sides of the 120 volt AC lines to change the direction of the main drive motor in the washing machine.

In such designs, e.g. shown in FIG. 1, the timer typically uses two single pole double throw switches, shown as switching assembly 102 to accomplish this reversal by reversing the L1 and N connections to the starting winding 104. Such switching assemblies 102 are typically wired with a neutral line on one side of the center contacts 112, 114, and the L1 line on the other side of the center contacts 112, 114. Such switches are designed to have only one side of this switch made, or the other, i.e. contacts 116 and 122 closed, or contacts 118 and 120 closed. However, if the appliance sees a high shock or vibration while the timer is powered, the applicants have discovered that such high shock or vibration can cause the contacts 116, 118, 120, and 122 of the switching assembly 102 to bounce in such a manner that three or four of the contacts touch, which causes a dead short between the L1 and neutral sides of the 120 volt AC lines through the switching assembly 102. Such a dead short will typically result in the main circuit break on the assembly line power source to trip, possibly a tripped circuit breaker 124 in the motor through which this high current flows, and can cause welded contacts of the switching assembly 102.

If this fault occurs at the end of the quality testing cycle, it may go undetected and the washing machine may be released for sale to a consumer. However, once installed by a consumer, the washing machine will not operate properly and will require a service call to replace the timer and/or reset the circuit breaker. Not only will this result in a negative consumer experience, but it also increases the manufacture's warranty service costs and reduces the manufacture's quality reputation.

In view of the above, there is a need in the art for control circuitry for a consumer washing machine that enables multi-cycle operation while avoiding catastrophic contact welding failures resulting from the high shock and vibration experienced during the quality control testing phase of final manufacturing of the appliance, or vibration in the home caused, e.g., by severe off balance loads. Embodiments of the present invention provide such a control system and circuitry. These and other advantages of the invention, as well as additional inventive features, will be apparent from the description of the invention provided herein.

BRIEF SUMMARY OF THE INVENTION

In view of the above, embodiments of the present invention provide new and improved control circuitry and system for consumer and commercial appliances. More particularly, embodiments of the present invention provide a new and improved circuitry and control system for consumer and commercial washing machines. Still more particularly, embodiments of the present invention provide new and improved control circuitry and system for consumer and commercial washing machines that overcome one or more of the problems existing in the art discussed above without unduly increasing the cost of such controls or circuitry by adding additional components thereto.

In one embodiment of the present invention, the control wiring for the washing machine utilizes the same switching assembly and the mechanical timer to switch the L1 and neutral side of 120 volt AC lines to change the direction of the main drive motor for the washing machine. However, the wiring of the switch contacts is coupled through the centrifugal switch of the washing machine. In such a manner, after the motor starts, the centrifugal switch opens as part of its normal operation, the L1 side of the 120 volt line is opened to the switching assembly. In this way, if three or four of the contacts bounce and touch due to the high shock or vibration in the quality testing cycle of the manufacturing process, a dead short does not result and no failure occurs.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
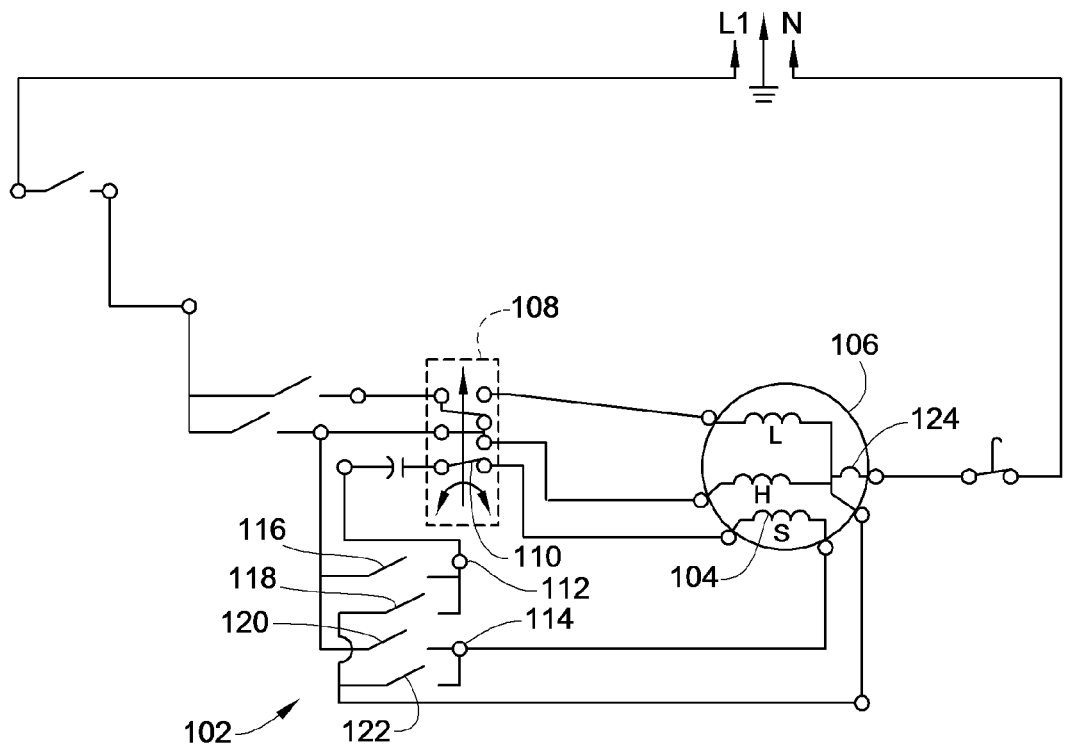
FIG. 1 is a simplified single line wiring diagram of a the control wiring for a typical washing machine suffering from the problem discussed above.
Figure 2:
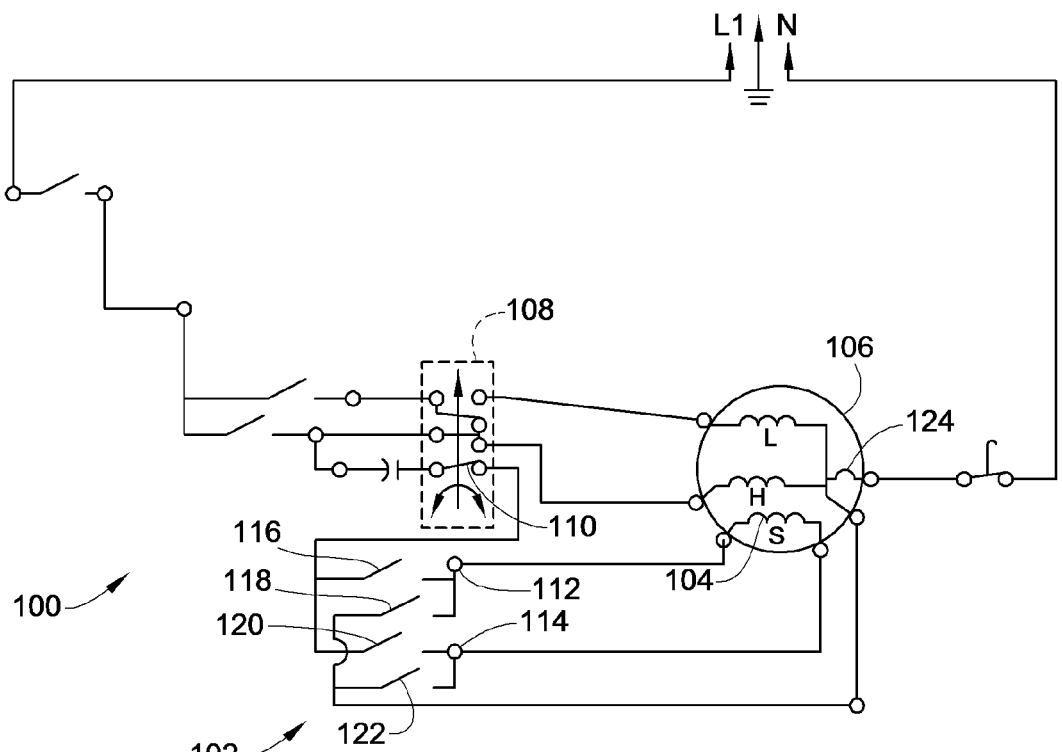
FIG. 2 is a simplified single line wiring diagram of an embodiment of the control wiring for a washing machine constructed in accordance with the teachings of the present invention.

Turning now to the drawings, there is illustrated in FIG. 2 a simplified single line wiring schematic of one embodiment of the control wiring circuit for use in consumer or commercial washing machines constructed in accordance with the teachings of the present invention. In order to understand the operation and advantages provided by embodiments of the wiring of the present invention, operation of a washing machine must be understood. As such, and by way of example and not by limitation, the initial discussion that follows will provide a context of the appliance's operation to aid in a full understanding of the advantages and operation of embodiments of the instant invention.

In a typical washing machine a timer mechanism is used to control the various cycles that are necessary to complete the washing operation. These cycles include a filling operation, a washing or agitation operation, a drain and spin operation, a rinse operation, etc. Either during such cycles, operation in subsequent cycles, or both, the direction of operation of the main motor 106 must be reversed. This reversal is accomplished, in washing machines that use a single phase, split phase induction motor, which includes both a starting winding S 104 and a running winding(s) H, L (and possibly M), by reversing the L1 and neutral connections to the starting winding 104. If connection in one orientation will begin the motor 106 operating in a clockwise direction, e.g. closure of contacts 116 and 122, reversal of the L1 and neutral lines to the starting winding 104 by closing contacts 118 and 120 (and opening of contacts 116 and 122) will cause the motor 106 to begin operation in the counter-clockwise direction. As discussed above, the typical control circuitry of a washing machine utilizes a pair of single pole double throw switches in a switching assembly 102 controlled by the mechanical timer to accomplish this reversal of the L1 and neutral lines to the starting winding 104 of the motor 106.

Once the motor 106 has come up to its normal operating speed, a centrifugal switch 108 is used to disconnect the starting winding 104 of the motor 106 by opening contact 110 since it is no longer needed to continue operation of the motor 106, i.e. the motor 106 continues to operate solely using its running winding (H or L in the illustrated embodiment). Because the centrifugal switch 108 is a mechanical device that utilizes the centrifugal force created by the rotating shaft of the motor 106 to perform its switching operation, it is installed in close physical proximity to the motor 106. This provides efficient wiring of the appliance since the power lines must be physically connected to the motor 106 anyway.

The applicants recognized that the cost pressures on the consumer appliance manufactures would not allow a typical solution of adding isolation circuitry or changing to a more complex, and thus more costly, switching mechanism in the control panel to overcome the contact shorting problem discussed above. Further, any additional components, and therefore the additional cost, could not be justified by the minimal occurrence of such problems. Nonetheless, the applicants realized that the fact that such a failure could occur and could be missed at the end of the quality testing cycle and result in at least some appliances ending up in the hands of consumers where the damage to the quality reputation of the manufacture would be significantly detrimental. Further, there would be a loss of productivity at the washing machine assembly plant, subsequent rework and test, and assembly if the fault welded the timers.

In view of these pressures, the applicants determined that a change in the control wiring for the mechanical timer would provide the best solution to overcome this problem while minimizing the cost and complexity impact to the design and manufacturer of the washing machine. Initially this design met with resistance in view of the increased wiring harness complexity that would require wiring from the control panel to the input of the mechanical timer switching assembly 102 be run down to the centrifugal switch 108 of the motor 106 located in the bottom of the washing machine and back up to the control panel located on the top.

Further, this design solution was not seen as preventing the occurrence of this contact welding problem during the entire quality testing phase of manufacturing, and therefore not ideal. That is, it was believed that if this contact bounce problem occurs while the main motor 106 is not operating, or just starting up, utilizing the centrifugal switch 108 as will be discussed below would not provide any protection to the contract welding problem because both the L1 and neutral lines to contacts 116, 118, 120, and 122 are connected to the 120 volt source.

However, despite this resistance, the applicants were able to explain that, while the failure may still occur, the likelihood that it would occur and not be detected during the manufacturing quality testing operation is now significantly reduced. That is, if the contact welding problem occurs it will only do so when the motor 106 is powered but not operating or when the motor 106 is attempted to be started. In such a case, the motor 106 will not be able to be started properly, and the detection of the problem will most likely occur. Further, the majority of the time that the washing machine is undergoing its quality testing during the manufacturing process, the motor 106 is operating, and therefore the period of time during which the fault could occur is also significantly reduced.

Having overcome the initial resistance to such control wiring change, one embodiment of the control wiring 100 of the present invention illustrated in FIG. 2 routes the L1 line of the 120 VAC voltage source through either contact 116 or 120 of the switching assembly 102 used by the mechanical timer to change the orientation of the power to the starter winding 104 of the motor 106 to the centrifugal switch 108. The circuit to the starter winding 104 is completed through contact 122 (when contact 116 is closed) or through contact 118 (when contact 120 is closed). Such change in wiring will allow the mechanical timer to continue to operate in its normal fashion to provide power in the correct orientation to the starter winding 104 to drive the motor 106 in the desired direction during the various phases of operation of the washing machine.

However, once the motor 106 has come up to its operating speed and the centrifugal switch 108 operates to open its contact 110, it may be seen that the routing of the L1 input to the switching assembly 102 utilized by the mechanical timer removes or opens the connection to the L1 line of 120 VAC source. As such, any high shock or vibration that would cause the contacts 116, 118, 120, 122 of the switching assembly 102 to bounce, which previously resulted in the contact welding failure problem discussed above, will not no longer result in a dead short. Without a dead short between the L1 and neutral lines, no contact welding or circuit breaker failures will occur, despite the fact that the high shock or vibration has caused the contact bounce problem resulting in the contacts, e.g. contact 116 and contact 118, and/or contact 120 and contact 122, of the switching assembly 102 touching for a short period of time.

In other words, the embodiment of the control wiring system 100 of the present invention illustrated in FIG. 2 shows that the switching assembly 102 is utilized to change the input to the starter winding 104 of the washing machines motor 106. Centrifugal switch 108 is connected to the output shaft (not shown) of the motor 106, and when the motor 106 is up to operating speed, contact 110 opens to disconnect the starter winding 104 as is known in the art. In the embodiment illustrated in FIG. 2, opening contact 110 of the centrifugal switch 108 also opens the input to the L1 terminal, i.e. the connection to contacts 116, 120, of the switching assembly 102. In this way, should a contact bounce situation occur due to high shock or vibration loading during the manufacturing quality testing process, contact of all contacts, e.g. contact 116 and contact 118, and/or contact 120 and contact 122, of switching assembly 102 will not result in a short between L1 and N due to the open contact 110. As such, no contact welding failure will occur.

While the embodiment of the present invention illustrated in FIG. 2 illustrates an embodiment of the wiring system 100 of the present invention wherein contact 110 of the centrifugal switch 108 is wired to the L1 input to the switching assembly 102, it should be recognized from the foregoing that the neutral side could be similarly wired. Operation of such an embodiment is identical to that described above, except that the N input to switching assembly 102 is opened upon operation of centrifugal switch 108 as opposed to the L1 line. Similarly, a further embodiment of the control wiring system 100 that utilizes a centrifugal switch 108 having an additional switching set of contacts to allow both the L1 and N inputs to switching assembly 102 to be opened upon operation of centrifugal switch 108.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A control wiring system for a top loading clothes washing machine, comprising:
   a single phase, split phase induction motor having a starting winding;
   a centrifugal switch mechanically coupled to an output shaft of the motor, the centrifugal switch having a switching contact electrically coupled in series with the starting winding;
   a switching assembly having a first contact for receiving an L1 input from an external source of power, a second contact for receiving a N input from the external source of power, and a third contact for supplying one of the L1 input or the N input to one side of the starting winding of the motor, and a fourth contact for supplying one of the N input or the L1 input to another side of the starting winding based on a position of poles of the switching assembly; and
   electrical wiring coupling in series the L1 input through the switching contact of the centrifugal switch prior to coupling the L1 input to the first contact of the switching assembly.

2. The control wiring system of claim 1, wherein application of power to the starting winding through the switching assembly will begin rotation of the motor and, once the motor reaches its operating speed, will cause the centrifugal switch to open the switching contact to remove the application of power to the starting winding by opening the connection from the L1 input to the switching assembly.

3. The control wiring system of claim 2, wherein the centrifugal switch closes the switching contact when the motor is de-energized to thereby reconnect the L1 input to the first contact of the switching assembly.

4. The control wiring system of claim 1, wherein the centrifugal switch includes a second switching contact, and wherein the electric wiring further couples in series the N input through the second switching contact of the centrifugal switch prior to coupling the N input to the second contact of the switching assembly.

5. The control wiring system of claim 4, wherein application of power to the starting winding through the switching assembly will begin rotation of the motor and, once the motor reaches its operating speed, will cause the centrifugal switch to open the switching contact to remove the application of power to the starting winding by opening the connection from the L1 input to the switching assembly, and will cause the centrifugal switch to open the second switching contact to open the connection from the N input to the switching assembly.

6. The control wiring system of claim 5, wherein the centrifugal switch closes the switching contact and the second switching contact when the motor is de-energized to thereby reconnect the L1 input to the first contact of the switching assembly, and the N input to the second contact of the switching assembly.

7. A control wiring system for a washing machine, comprising:
   a single phase, split phase induction motor having a starting winding;
   a centrifugal switch mechanically coupled to an output shaft of the motor, the centrifugal switch having a switching contact electrically coupled in series with the starting winding;
   a switching assembly having a first contact for receiving an L1 input from an external source of power, a second contact for receiving a N input from the external source of power, a third contact for supplying one of the L1 input or the N input to one side of the starting winding of the motor based on the position of the pole of the switching assembly, and a fourth contact for supplying one of the N input or the L1 input to another side of the starting winding of the motor based on the position of the pole of the switching assembly; and
   electrical wiring coupling in series the N input through the switching contact of the centrifugal switch prior to coupling the N input to the second contact of the switching assembly.

8. The control wiring system of claim 7, wherein application of power to the starting winding through the switching assembly will begin rotation of the motor and, once the motor reaches its operating speed, will cause the centrifugal switch to open the switching contact to remove the application of power to the starting winding by opening the connection from the N input to the switching assembly.

9. The control wiring system of claim 8, wherein the centrifugal switch closes the switching contact when the motor is de-energized to thereby reconnect the N input to the second contact of the switching assembly.

10. The control wiring system of claim 7, wherein the centrifugal switch includes a second switching contact, and wherein the electric wiring further couples in series the L1 input through the second switching contact of the centrifugal switch prior to coupling the L1 input to the first contact of the switching assembly.

11. The control wiring system of claim 10, wherein application of power to the starting winding through the switching assembly will begin rotation of the motor and, once the motor reaches its operating speed, will cause the centrifugal switch to open the switching contact to remove the application of power to the starting winding by opening the connection from the N input to the switching assembly, and will cause the centrifugal switch to open the second switching contact to open the connection from the L1 input to the switching assembly.

12. The control wiring system of claim 10, wherein the centrifugal switch closes the switching contact and the second switching contact when the motor is de-energized to thereby reconnect the L1 input to the first contact of the switching assembly, and the N input to the second contact of the switching assembly.

13. A control wiring system for a washing machine, comprising:
   a single phase, split phase induction motor having a starting winding;
   a centrifugal switch mechanically coupled to an output shaft of the motor, the centrifugal switch having a first switching contact electrically coupled in series with the starting winding, the centrifugal switch further including a second switching contact;
   a switching assembly having a first contact for receiving an L1 input from an external source of power, a second contact for receiving a N input from the external source of power, a third contact for supplying one of the L1 input or the N input to one side of the starting winding of the motor based on the position of the pole of the switching assembly, and a fourth contact for supplying one of the N input or the L1 input to another side of the starting winding of the motor based on the position of the pole of the switching assembly; and
   electrical wiring coupling in series the L1 input through the first switching contact of the centrifugal switch prior to coupling the L1 input to the first contact of the switching assembly, and coupling in series the N input through the second switching contact prior to coupling the N input to the second contact of the switching assembly.

14. The control wiring system of claim 13, wherein application of power to the starting winding through the switching assembly will begin rotation of the motor and, once the motor nears its operating speed, will cause the centrifugal switch to open the first switching contact open the connection from the L1 input to the switching assembly, and will cause the centrifugal switch to open the second switching contact to open the connection from the N input to the switching assembly.

15. The control wiring system of claim 14, wherein the centrifugal switch closes the first switching contact and the second switching contact when the motor slows to thereby reconnect the L1 input to the first contact of the switching assembly, and the N input to the second contact of the switching assembly.

* * * * *